Figure 5:
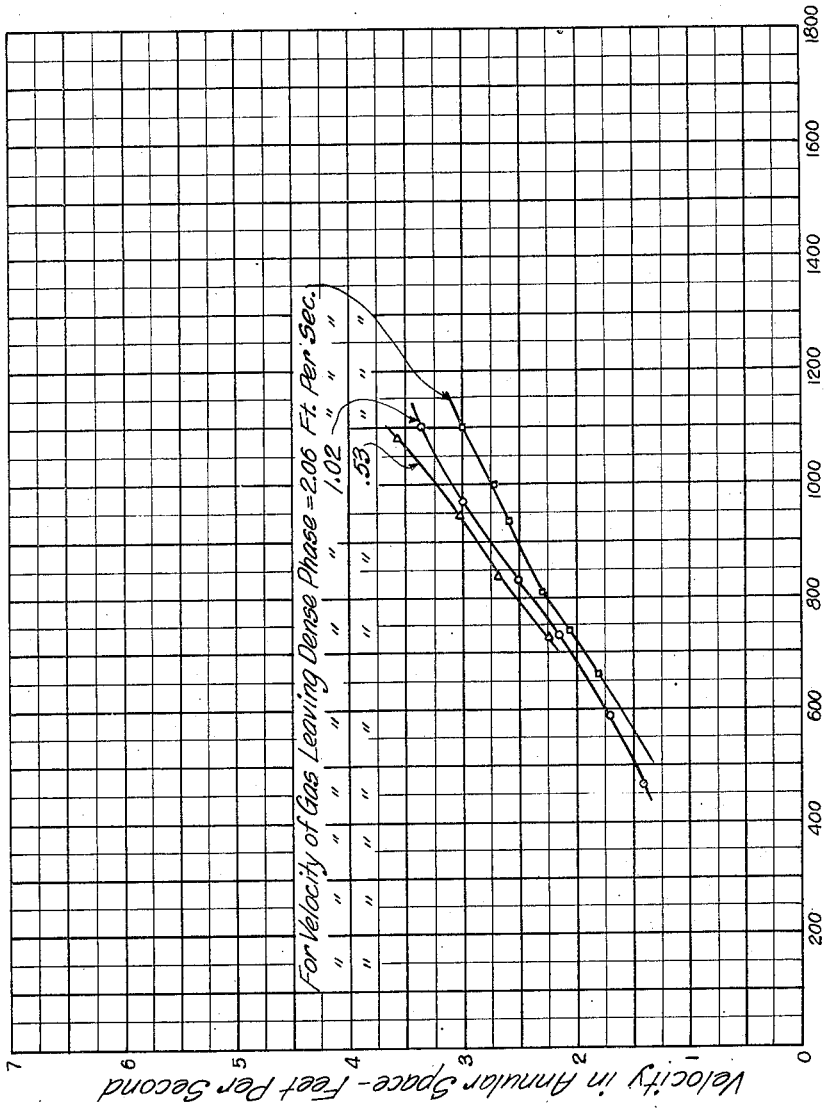

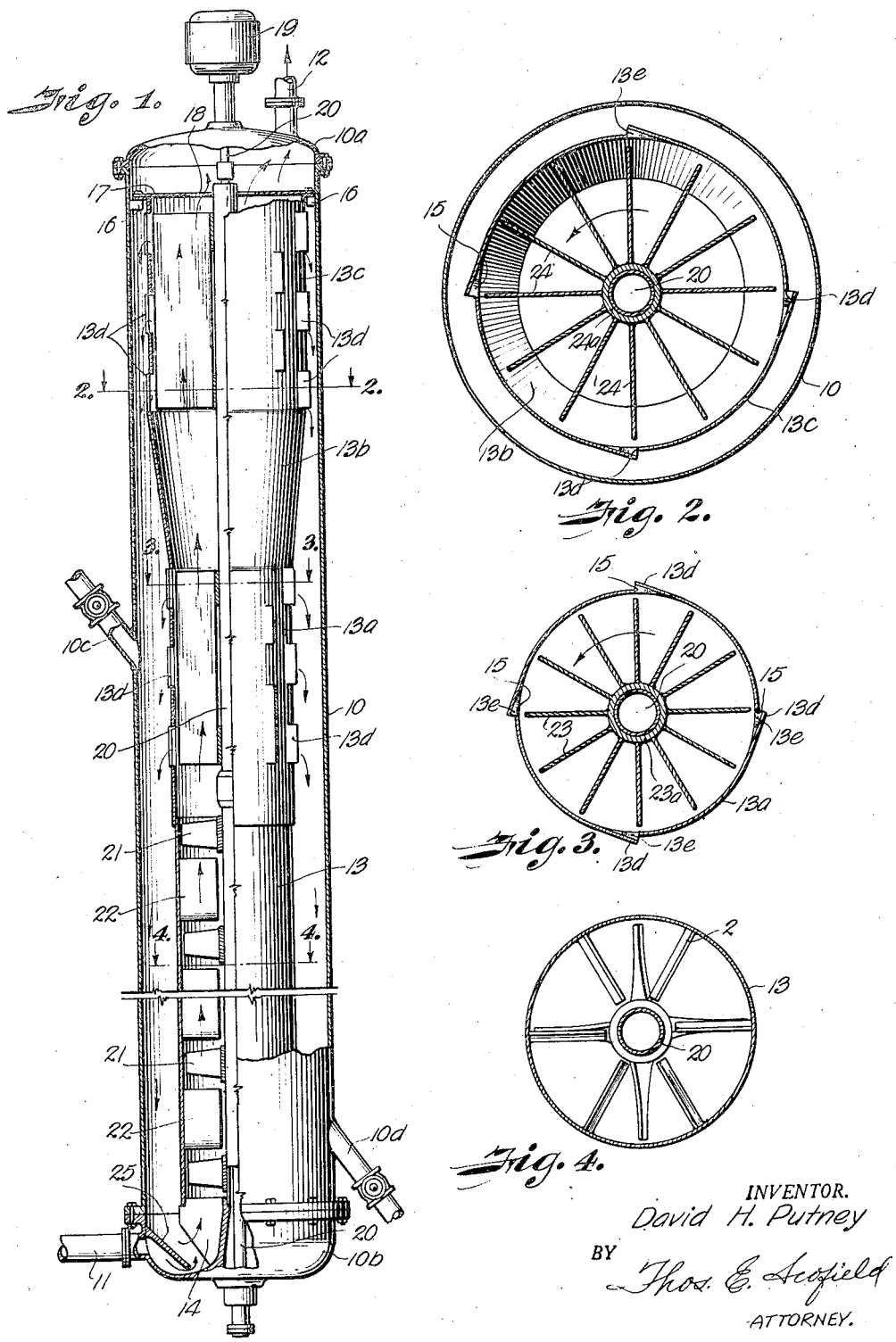

Patented Nov. 8, 1949

2,487,370

UNITED STATES PATENT OFFICE 2,487,370

CONTACTOR AND SEPARATOR FOR LOW-DENSITY SOLIDS

David H. Putney, Kansas City, Mo., assignor to Stratford Development Corporation, Kansas City, Mo., a corporation of Delaware Application January 11, 1946, Serial No. 640,619

4 Claims. (Cl. 23—1)

This invention relates to improvements in a method and apparatus for contacting and separating relatively low density pulverized solids from gases or vapors and refers more particularly to a contactor and separator device employing the circulating tube principle wherein the gas-solids mixture is mechanically impelled through the inner tube wherein are maintained zones of dense, mixed and dilute phase, the solids being projected radially from the mixed and dilute phases through apertures in the inner tube for recirculation through the annular space surrounding the tube back to the inlet of the dense phase zone. The term mixed phase, as employed in the instant specification, is descriptive of the upper portion of a fluidized bed of light pulverized solids, i. e., the density of said upper portion is less than that of the dense lower phase of said bed, but very much greater than that of the superimposed dilute phase.

An object of the invention, therefore, is to provide an efficient and effective method and apparatus for contacting gases and vapors with pulverized solids in an initial zone of mixing, and separating the solids from the gaseous material in subsequent zones.

Another object is to provide a contactor and separator in which lineal flow is mechanically imparted to the mixture in a dense phase zone while rotative velocity is mechanically imparted to the mixture in the mixed and dilute phase zones to separate the solids from the gases or vapors.

A further object is to provide a contactor and separator wherein after intimate mixture in the dense phase zone the gas-solids suspension is rapidly rotated and the solid particles projected through apertures in the circulating tube to be introduced to a counter-flowing stream of gas and solids in the annular space surrounding the circulating tube, thus producing a cyclic flow and removal of the solid denuded gases from the discharge end of the dilute phase zone.

Still another object is to provide a contactor and separator adapted to be operated either with batch pulverized solid charge or with continuous solid feed and withdrawal in the treatment of gas-solids mixtures wherein low density powdered solids are used.

Other and further objects of the invention will appear from the following description.

In the accompanying drawings which form a part of the instant specification and are to be read in conjunction therewith, and wherein like reference numerals indicate like parts in the various views, Fig. 1 is a sectional view of an apparatus embodying the invention with parts broken away.

Fig. 2 is a view taken along the line 2—2 in Fig. 1 in the direction of the arrows, Fig. 3 is a view taken along the line 3—3 in Fig. 1 in the direction of the arrows, Fig. 4 is a view taken along the line 4—4 in Fig. 1 in the direction of the arrows, and Fig. 5 is a graph indicating the downward circulating velocities in the annular dense phase at different shaft velocities.

In the drawings wherein for the purpose of illustration is shown an embodiment of the invention adapted to be operated with continuous vapor feed but with batch catalyst charge, the numeral 10 designates the outer shell of the contactor and separator. This cylindrical vessel has a top cover 10a and a bottom 10b bolted to the vessel by suitable flanges. Into the bottom is connected an inlet pipe 11 and into the top an outlet 12. Within the vessel is a circulating tube comprising a lower dense phase section 13. Section 13 is open at the bottom and is supported within the vessel upon vertical vanes or baffles 14. Above the section 13 surrounding the dense phase zone is section 13a concentric with and forming an extension of the lower section. Section 13a provides the enclosure for the mixed phase zone. Above section 13a is a tapered section 13b and above the latter section is section 13c which surrounds the dilute phase zone. In the periphery of sections 13a and 13c are cut from the shell of the circulating tube louvers or baffles 13d forming apertures 15 in the tube wall. The upper flanged end of the circulating tube is supported upon an annular ring 16 welded or otherwise fastened in the shell of the outer vessel. An annular baffle 17 also supported on ring 16 has a central restricted discharge opening 18 of less diameter than that of the circulating tube.

Mounted upon the top 10a is a prime mover such as a motor diagrammatically shown at 19. This motor drives shaft 20 which has suitable bearings in the top and bottom of the outer vessel. At intervals on shaft 20 and within the lower section 13 of the circulating tube are impellers 21. Intermediate the impellers are straightening vanes 22 affixed to the inner wall of the circulating tube. Within section 13a of the circulating tube and rotating with shaft 20 is a separating wheel consisting of radial vanes 23 mounted upon a central hub 23a. Within section 13c of the circulating tube is a second wheel having radial vanes 24 mounted upon a central hub 24a. Impellers 21 within the dense phase zone are pitched to produce an upward lineal movement of the gas-solids mixture passing through this section of the circulating tube. Wheels 23 and 24 have vertical vanes preferably without pitch adapted to impart rotative velocity to the mixed phase and dilute phase mixtures passing through the upper sections of the tube.

When the contactor-separator is used with batch solid charge the pulverized solid is supplied to the machine through a valved inlet pipe 10c to a level somewhat above the top of section 13 with valved outpipe 10d closed. Vapor or gas to be reacted is then introduced through the lower inlet pipe 11. It passes beneath inclined baffle 25 and rises into the open end of the circulating tube through straightening baffles 14. Central shaft 20 is rotated driving impellers 21 which moves the solid particles and gases upwardly through the tube. The pitch of the impellers causes the mixture in the dense phase section to be intimately contacted and to rise upwardly.

As the mixture passes into section 13a, or what has been termed the mixed phase zone, radial vanes 23 of the rotating wheel impart rotative velocity to the gas-solids mixture throwing the solid particles to the inner wall of the tube where they pass through the apertures 15 into the annular space between the circulating tube and outer vessel. The gas-solid mixture not separated in the mixed phase zone passes upwardly through tapered section 13b to the dilute phase section 13c. In this section the mixture is again subjected to the rotative forces set up by vanes 24 of the upper separator wheel. Again the solid particles are projected to the inner wall of the dilute phase section and pass out through apertures 15 in the peripheral wall of the tube. Louvers 13d both in the mixed phase section 13a and dilute phase section 13c preferably are equipped with downward deflecting ribs or baffles 13e attached to their inner surfaces to change the course of the solid particles as they pass through the apertures in the direction shown by the arrows. Thus it will be seen that there is an upward movement of the gas-solids mixture within the circulating tube and a downflowing stream in the annular space surrounding the circulating tube. Annular baffle 17 at the top of the circulating tube is added assurance that solid particles do not pass off with the clarified gases through outlet opening 18 since it is difficult for the particles to work back toward the shaft against forces set up by the separator wheel. From the top of the outer vessel the gases or vapors denuded of solid particles are discharged through pipe 12.

The annular space between vessels 10 and 13c is closed gas-tight at the top by support ring 16 and baffle plate 17. Gases and solids discharged into the annular space through apertures 15 in sections 13a and 13c return to the bottom of the vessel where they are reintroduced to the bottom of the circulating tube. Thus, there is set up a cyclic flow within the contactor-separator, one stream consisting of a lower dense phase, an intermediate mixed phase and an upper dilute phase within the circulating tube and a recycled stream in the annular space surrounding the tube.

It is contemplated that the contactor-separator may be operated with continuous solid feed as well as batch, in which case pulverized solids will be continuously supplied to the outer vessel into the annular space through inlet 10c and discharged from the bottom through outpipe 10d in controlled amounts to maintain proper concentration and level of catalyst in the machine.

There have heretofore been disclosed contactors for mixing and circulating finely divided solids with gases or vapors in a dense phase, that is, with the finely divided solids aerated to a flowing condition by the gases or vapors, but not carried in suspension thereby. In such devices the dense phase mixture is charged to the lower portion of the apparatus and the gases and vapors release themselves from the top of the fluidized bed carrying with them only such relatively small quantities of pulverized solids as are supported in suspension by reason of the velocity of the gases or vapors. The space above the fluidized dense phase in such machines is commonly referred to as the dilute phase. Such contactors have been found to operate satisfactorily with pulverized solids which are relatively heavy, for example, those whose weight in an unpacked bulk state is 26 pounds per cubic foot and heavier. When handling extremely light pulverized solids, particularly those weighing less than 30 pounds per cubic foot, there is a tendency for the dense and dilute phases to merge with considerable quantity of the finely divided solids floated or held in suspension in the upper or dilute phase portion of the apparatus. This is occasioned by the velocity of the vapors or gases leaving the dense phase having sufficient magnitude to overcome the force of gravity acting upon the light solid particles.

It has been found that these lighter pulverized solids, such as diatomaceous earth and Kieselguhr base catalysts used in cracking and synthesis operations, may be satisfactorily circulated and separated by the contactor-separator hereinbefore described.

Tests utilizing the principles of the invention and an apparatus according to the construction shown have been made on a machine utilizing a gaseous medium and a cobalt-thorium Kieselguhr pulverized catalyst weighing approximately 22 pounds per cubic foot. Satisfactory circulation was established within the dense phase and the carry-over of catalyst particles was very low. It is estimated that approximately 98% of the solids from the dense phase were separated by the lower wheel 23 and discharged through the slot 15 of the cylinder surrounding the wheel. Substantially all of the remaining 2% of solid material was eliminated or thrown out through the slots of the cylinder by the upper wheel 24. There was no tendency for an accumulation of solid material in the upper portion of the machine and a well defined borderline could be observed in the annular space between the dense and dilute phases. The outer shell of the machine was constructed of Lucite so the movement and separation of the gases and solids within the machine could be observed. The graph in Fig. 5 shows the velocity in feet per second of the dense phase mixture flowing downwardly in the annular space of the lower portion of a 12 inch diameter machine when operating the shaft at different rotative velocities.

As suggested, this design of contactor-separator is particularly useful in circulating finely divided solids which are readily floated in an air stream. Attempts to circulate such light pulverized solids in a machine such as described in copending application Serial No. 567,240, filed December 8, 1944, now Patent No. 2,453,592, were unsuccessful, although such machines were extremely successful in handling the heavier catalysts such as natural and synthetic aluminum hydrosilicates. The apparatus here disclosed may be built in various sizes and shapes utilizing the same principles and may be equipped with heating or cooling elements in the form of jackets, or tubes in the annular space to offset exothermic or endothermic heats of reaction.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the drawings is to be interpreted as illustrative and not in a limiting sense.

Having thus described my invention, I claim:

1. A method of contacting gaseous material with pulverized solids and separating the solids therefrom after contact, comprising the steps of passing a gaseous-solids mixture upwardly in a confined stream wherein there is maintained a dense-phase zone in the lower portion and a dilute-phase zone in the upper portion, mechanically imparting upward lineal flow to the stream in the dense phase and rotative velocity to the stream in the upper portion of the dense-phase and dilute-phase zones, passing the separated dense-phase solids with any entrained gas in an annular down-flowing stream surrounding the lower portion of the up-flowing stream, passing the separated gas from the dense-phase zone with entrained solids to the dilute-phase zone and there separating the solids from the gas by rotative velocity aforesaid, returning solids separated in the dilute-phase zone with entrained gas in an annular down-flowing stream surrounding the upper portion of the up-flowing stream to join the down-flowing solids in the stream surrounding the dense-phase zone, removing the solids-denuded gases from the top of the dilute-phase zone and recycling combined solids from the dense and dilute-phase zone with entrained gas to the up-flowing stream of the dense-phase zone.

2. A method as in claim 1 in which fresh or regenerated solids are continuously fed to the dense phase and separated solids are removed from the down-flowing stream surrounding the dense-phase zone.

3. A contactor for mixing low density solids with gases and separating the solids from the gases, comprising vertical concentric vessels, the inner vessel open at both ends and somewhat smaller in diameter and shorter in length than the outer vessel and having a lower mixing section and an upper separating section, the annular space between the vessels open at the bottom and closed at the top, the outer vessel equipped with a bottom gas inlet and an upper gas outlet, pipe connections for introducing and withdrawing pulverized solids, a shaft extending axially through said vessels, pumping impellers mounted at intervals on the shaft within the mixing section on the inner vessel, a lower or dense phase centrifugal separating wheel with vertical radial vanes attached to the shaft within the lower portion of the separating section of the inner vessel, slots in the wall of the inner vessel adjacent the periphery of said separating wheel, an upper dilute-phase centrifugal separating wheel with vertical radial vanes attached to the shaft within the inner vessel located above the dense-phase wheel and slots in the wall of the inner vessel adjacent the periphery of the upper separating wheel.

4. A contactor and separator as in claim 3 wherein stationary straightening vanes are disposed intermediate the pumping impellers adapted to prevent rotative motion of the mass in the mixing section and assist in inducing axial flow of the gas-solid mass upwardly through the interior vessel.

DAVID H. PUTNEY.

REFERENCES CITED

The following references are of record in the file of this patent:

UNITED STATES PATENTS

| Number | Name | Date |
|---|---|---|
| 2,194,666 | Meissner | Mar. 26, 1940 |
| 2,363,834 | Crater | Nov. 28, 1944 |
| 2,419,088 | Putney | Apr. 15, 1947 |